United States Patent Office 2,950,978
Patented Aug. 30, 1960

2,950,978

PROCESS OF PREPARING A DRY RAVIOLI PRODUCT

Virgil Milani, 1929 East-West Highway, Silver Spring, Md.

No Drawing. Filed Nov. 13, 1957, Ser. No. 696,018

2 Claims. (Cl. 99—199)

My invention relates to a useful improvement and modification which pertains more specifically, but not exclusively, to the alimentary product known as ravioli.

More specifically my invention relates to a dry filling mainly by means of which it is possible to prepare ravioli in a dry form. The object of having ravioli in a dry form is that in this condition they may be stored for relatively long periods of time, prior to cooking for consumption, without the necessity of any special precautions being taken to prevent deterioration.

Ravioli, as known heretofore, and before my invention, consisted of a filling contained between two small sheets of wheat flour dough, the edges of which were sealed all around, so as to form a sealed envelope. The filling, generally made of either fresh ricotta (an Italian type of cottage cheese) and seasonings, or of freshly cooked ground meat and seasonings, if, of course, always wet, or moist. The bulk of this filling forms a bulge in the center of the ravioli the diameter of which is roughly one half to three fourths the diameter, of length, of the individual ravioli. (These ravioli are served for consumption after cooking, generally by boiling in water, straining, and adding, generally, spaghetti sauce and grated cheese.)

These ravioli (the uncooked ones), due to the perishable nature of its ingredients (fresh dough, ricotta, freshly cooked meat—all wet ingredients) were always made fresh, either daily and cooked the same day, or kept under refrigeration for future cooking and consumption. In the latter case the ravioli have to be thawed out, or their chill removed, before cooking by boiling, otherwise they will open up on boiling, thereby losing their filling in the cooking water. Even under refrigeration, ravioli are not generally kept more than three or four days, as beyond this point taste changes begin to appear due to deterioration. Ravioli have also been known to be kept under brine to preserve prior to cooking. In either case it can be seen that, at best, the shelf life of ravioli is short, cumbersome, and expensive. Furthermore, the taste of the ravioli preserved in either of the above two methods is reduced in quality, even when not spoiled.

The ravioli of my invention, on the other hand, are so modified that, by virtue of their dry (or non-hydrous) condition, may be preserved without deterioration in merchandising packages of the usual form (or loose) much like other dry pastes, such as macaroni and spaghetti; all the while retaining a fresh quality, which comes out on cooking.

In the ravioli of my invention three changes, or modifications, are introduced, so as to make possible their existing in a dry condition; the first one of which is the most important, while the second and the third are in the nature of improvements, or aids. These are: First—a dry (non-hydrous) filling which does not spoil mainly by virtue of its very dryness; Second—one or more holes, or punctures, in and through the dough of the belly of the ravioli so that moisture can get out more easily when drying, and boiling water can also get in more easily when cooking the dry ravioli. Third—crack preventing additives are incorporated in the dough of the ravioli so as to eliminate any cracking or breaking, either when drying the ravioli, or subsequently, when cooking them. A more detailed description of these three items is as follows:

(1) *The dry (or non-hydrous) filling.*—This can be made using the following basic ingredients:

(a) Dried ricotta (or other cheese) and seasonings.
(b) Dried mushrooms and seasonings.
(c) Dried fish (such as baccalá) and seasonings.
(d) Dried meats and seasonings.
(e) Dry amino acids and their salts contained in spinach leaves or other edible leaves.
(f) A mixture of any of the above.
(g) Any other edible substance in a dry or preserved state.

This filling can be prepared in a granular form, pill form, ball form, or any other convenient form. It is prepared in a granular form by continuously stirring the wet ingredients together until dry. The filling may now be used as is for incorporation in the ravioli, or it may be given a coating of egg white. When this is done the granules (or other forms of the filling) are wetted with egg white (preferably in beaten form) and subsequently allowed to dry in air. When cooked, this coating of egg albumen will become water insoluble and will hold encased in itself the filling ingredients; thus preventing water soluble material, such as salt, amino acid salts, etc., from dissolving to any appreciable, or significant, extent, and finding its way out of the ravioli into the cooking water. It is to be understood that this filling is dry with respect to water only, but could conceivably be wet with respect to some other substance (i.e. glycerine, some non aqueous preservative, or other).

(2) *The feature of the puncture, or punctures in the belly of the ravioli.*—One or more holes, or punctures, made in the dough of the belly, or bulge, of the ravioli, perform four functions:

(a) Permits moisture in the inside of the dough casing to escape much more easily when drying the ravioli.
(b) Permits boiling water, or steam, to reach the inside wall of the casing when cooking, so that the inside and the outside of the ravioli will cook simultaneously.
(c) Permits the boiling water, or steam, to reach the dry filling, thus moistening it, softening it, and cooking much faster than would otherwise be the case.
(d) Remove physical strains and stresses.

(3) *Crack preventing additives.*—The dough envelope which contains the dry filling is at first plastic and wet. It must be dried. In so doing, however, and no matter what drying method is used (whether it is hot air at temperatures below or above the boiling point or water; circulating hot air; warm air; cold air; air at room temperature; refrigerated air, or other) some of the ravioli crack or break, either in drying or when cooking, if no crack preventing agent, such as the ones listed below, were added, or incorporated, in the dough. These agents, which I have discovered by experimentation, are water soluble and are incorporated in the dough preferably through the water used in making the dough. The percentage of additive incorporated in the dough will vary with the additive, but roughly three to fifteen percent based on the weight of the flour used (dry basis), will cover the requirements. It will be noted that, except for one, all of the following additives are organic compounds containing one or more hydroxyl groups in the molecule, or will yield such hydroxyl containing molecules upon hydrolysis, or digestion. The additives are: glycerine, xylose, glucose and sucrose.

To recapitulate and sum up: In the ravioli of my invention, then, the filling, which is dry to start with, is placed between two sheets of plastic dough (one or both of which has one or more holes, or punctures, in the center) and then the two sheets are sealed together all around by applying pressure. Instead of two, only one sheet of dough may be used which, after the said filling has been placed near the center, is folded over the filling and sealed where the flaps meet, much like when making apple turnovers. It being understood the amount of filling used is small enough to leave around itself a margin of dough for sealing purposes.) The ravioli, the dough of which is, up to this point, plastic and moist, are dried by any of the well known methods used for drying macaroni products, or in an oven, preferably at temperatures somewhat above that of the boiling point of water. The time required to dry varies with the capacity of the facility and/or the quantity of ravioli being dried. By breaking one open at various intervals one soon learns the time required for drying a particular size batch. After drying the ravioli may be stored for future cooking.

Having described my invention, I claim:

1. The method of making hard, staple dried ravioli which has a long shelf-life and which can be subsequently boiled which includes the steps of forming dough from flour, water and 3% to 15% of a crack-preventing material selected from the group consisting of glycerine, xylose, glucose and sucrose, based on the dry weight of the flour, which crack-preventing material is unaffected at elevated drying and water-boiling temperatures, flattening the dough and forming two strips therefrom, placing dried ravioli filling on one of said strips, placing the other of said strips over the dried ravioli filling and said one strip, sealing the edge portions of said strips to form an envelope around the dried ravioli filling, perforating the envelope adjacent the filling and thereafter drying the envelope, the envelope being characterized in that during drying thereof and during subsequent cooking of the dried ravioli in boiling water, the envelope will not crack and break.

2. The method of making hard, staple dried ravioli which has a long shelf-life and which can be subsequently boiled which includes the steps of forming dough from flour, water and 3% to 15% of a crack-preventing material selected from the group consisting of glycerine, xylose, glucose and sucrose, based on the dry weight of the flour, which crack-preventing material is unaffected at elevated drying and water-boiling temperatures, flattening the dough into strip form, placing dried ravioli filling adjacent one end of said strip inwardly of the edges thereof, folding the other end of said strip over the dried ravioli filling, sealing the free edge portions of said strip to form an envelope around the dried ravioli filling, perforating the envelope adjacent the filling and thereafter drying the envelope, the envelope being characterized in that during drying thereof and during subsequent cooking of the dried ravioli in boiling water, the envelope will not crack and break.

References Cited in the file of this patent
UNITED STATES PATENTS

| | | |
|---|---|---|
| 1,062,969 | Harrison | May 27, 1913 |
| 2,450,525 | Samson | Oct. 5, 1948 |
| 2,836,498 | Fennema | May 27, 1958 |

OTHER REFERENCES

"Drying and Dehydration of Foods," 1943 by Von Loesecke, Reinhold Publishing Corp. (New York), page 4.

The Italian Cookbook, 1955 by Taglienti, Random House (New York), pp. 67–68.

"Cereal Science Today," July 1957, page 161.